Patented July 8, 1930

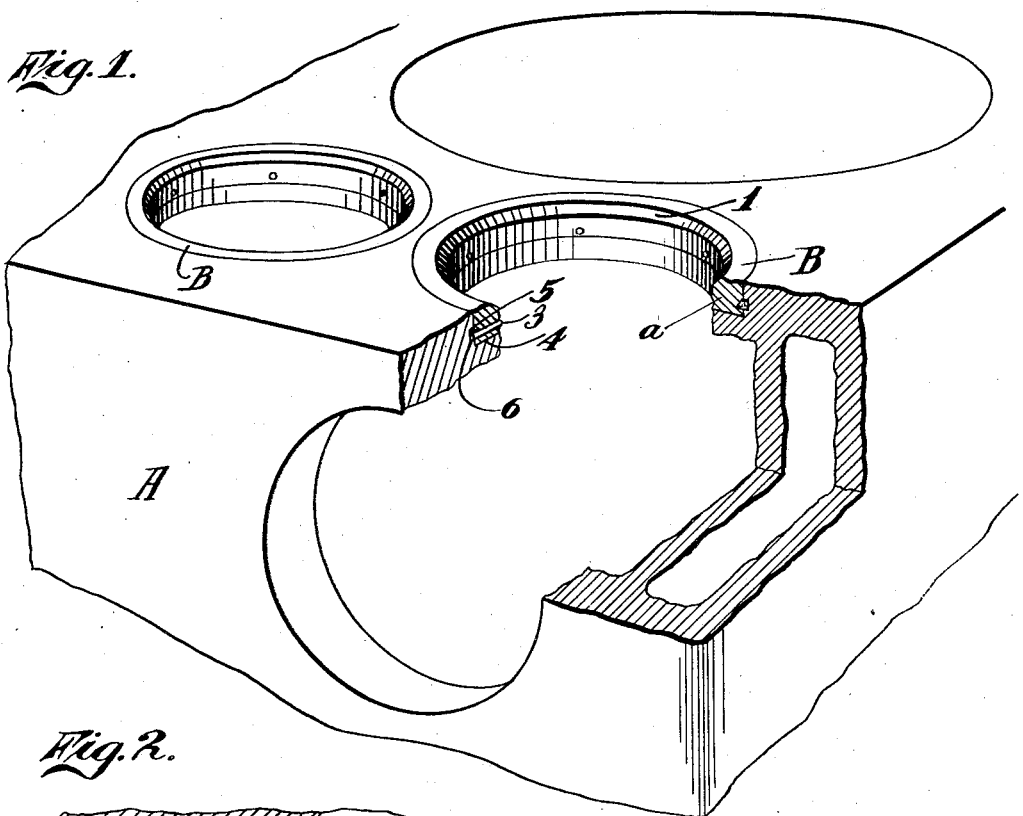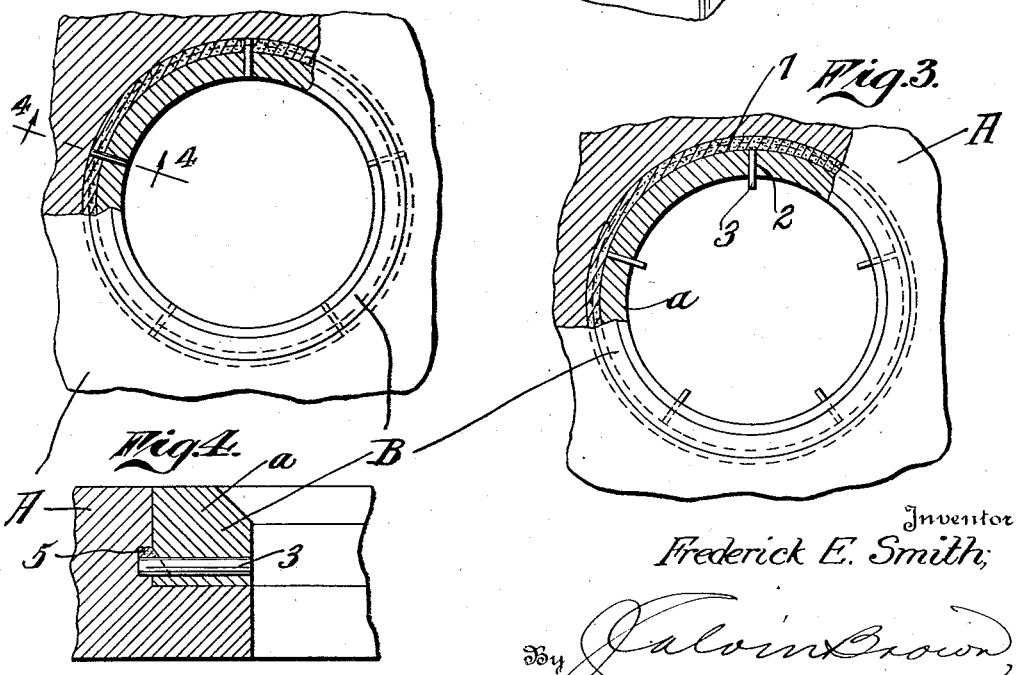

1,770,112

UNITED STATES PATENT OFFICE

FREDERICK E. SMITH, OF SANTA PAULA, CALIFORNIA

REPLACEMENT-VALVE SEAT

Application filed January 23, 1929. Serial No. 334,400.

This invention relates to replacement valve seats, and has for an object the provision of a novel means and manner whereby the valve seat may be readily replaced with a new valve seat and in which the new valve seat will function as satisfactorily as the old valve seat.

A further object is the provision of a replacement valve seat which when in position may be secured to an engine block or the like without fear of said replacement valve seat becoming loose.

The replacement valve seats may be installed without the necessity of utilizing complicated tools of any character and, in fact, may be installed by relatively unskilled workmen.

With the above objects and others, including simplicity of design, ease of installation, and general superiority including long life, the invention consists in the novel and useful provision, formation, construction, association and relative arrangement of parts, members and features, all as shown in a certain embodiment in the accompanying drawing, described generally and more particularly pointed out in the claims.

In the drawing:

Figure 1 is a perspective view, partly in section, of a cylinder block provided with the improved replacement valve seat, Figure 2 is a plan view partially in section, of a replacement valve seat in position in the valve opening of the cylinder block shown in Figure 1, Figure 3 is a view similar to Figure 2, certain elements of the replacement valve seat being in a changed position, and Figure 4 is a cross sectional view on the line 4—4 of Figure 2.

Referring now with particularity to the drawing, I have shown at A an engine block and at B a replacement valve seat. The replacement valve seat constitutes and comprises in the present instance, an annulus $a$ formed in part with a bevel face 1, and provided with a plurality of equidistantly spaced radial openings or bores 2, within which are received pins 3 which, under normal circumstances, are of greater length than the transverse thickness of said annulus. These pins have a fairly close fit within said openings.

While a replacement valve seat may be utilized for various purposes and in various combinations, yet one of its principal purposes is for use in internal combustion engines. It is known that the valve seats of internal combustion engines often become pitted, worn, out of true or round with resultant compression losses, due to improper seating of the valves. To overcome this, it is necessary to either regrind the valves or, if this cannot be conveniently done to make replacement of the seat that is damaged. In order to do this, and assuming that an engine block is being utilized, I first ream out the old valve seat substantially to a diameter equal to the diameter of the annulus of the replacement valve seat and this reaming will form a shoulder portion 4 in the cylinder block. This shoulder forms a convenient means for the seating of the replacement valve seat shown in Figure 1. In addition, the inner circular wall 5 of the block at said reamed portion is formed with an annular groove 6. The groove 6 is filled with a cement of some sort 7, such as an iron cement. This cement preferably has certain properties that render the same expandible and contractible with the block or head and is adapted to harden under influence of heat. Such a cement usually comes in powdered form and is obtainable upon the market, being adapted to be mixed with water to form a paste. This cement is placed within the groove 6, as before stated, whereupon the replacement valve seat is shouldered upon the part 4, as shown in the drawing. The pins 3 which extend radially outwardly from the inner wall of the replacement valve seat are then pushed inwardly so that the same are received within the annular groove 6 of the engine block and as shown in Figures 2 and 4. It is evident that a positive lock between the replacement valve seat and the engine block results and particularly so when the cement has hardened. Furthermore, the cement will act to hold the pins against movement, although said pins are not liable to have movement due to the fact that the fit of said pins within the bores of the replacement valve seat is comparatively tight.

It is evident that regardless of a cracking of the cylinder block, the replacement valve seat could not escape from said block due to the positive means, namely, the pins, utilized for holding the replacement valve seat in position.

It is obvious that various changes and modifications and variations may be made in practicing the invention in departure from the particular showing of the drawing and without departing from the true spirit thereof.

Having thus described my invention, what I claim and desire to secure by Letters Patent is:

1. As a new article of manufacture, a valve seat comprising an annulus, and a pin carried by said annulus and adapted to be extended beyond the periphery of said annulus.

2. As a new article of manufacture, a valve seat comprising an annulus, and a pin transversely carried by said annulus and adapted when in one position to extend beyond the periphery of said annulus.

3. As a new article of manufacture, a valve seat comprising an annulus formed with a plurality of equidistantly spaced transverse bores, and pins closely fitted within said bores, said pins being movable to position a portion of the same beyond the periphery of said annulus.

4. The combination with an engine block having a valve port, the wall of said port recessed and having a groove facing said port, of a valve seat adapted to be placed within said recess of the block, and a pin carried by said valve seat and adapted to extend beyond said valve seat for reception within said groove.

5. The combination with an engine block having a valve port, the wall of said port recessed and having an opening facing said port, of a valve seat comprising an annulus adapted to be placed within said recess of the block, and a pin carried by said annulus and adapted to extend beyond the periphery of said annulus for reception within said opening for locking said valve seat in position of service to the engine block.

6. The combination with an engine block having a valve port, the wall of said port recessed and having an opening facing said port, of a valve seat comprising an annulus adapted to be placed within the recess of the block, and a plurality of equidistantly spaced pins movably associated with said annulus and adapted to be extended into said opening for locking said annulus to the engine block.

In testimony whereof, I have signed my name to this specification at Los Angeles, California, this 3rd day of January, 1929.

FREDERICK E. SMITH.